No. 652,511. Patented June 26, 1900.
M. CROSSMAN.
HEATING DEVICE FOR FRUIT JARS.
(Application filed Mar. 10, 1900.)
(No Model.)
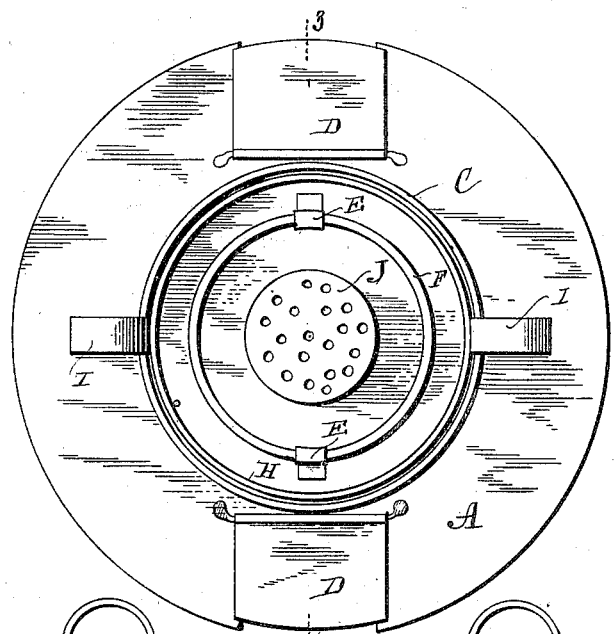
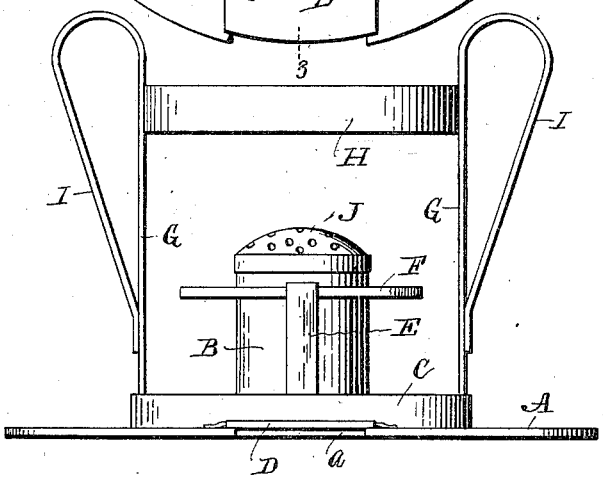
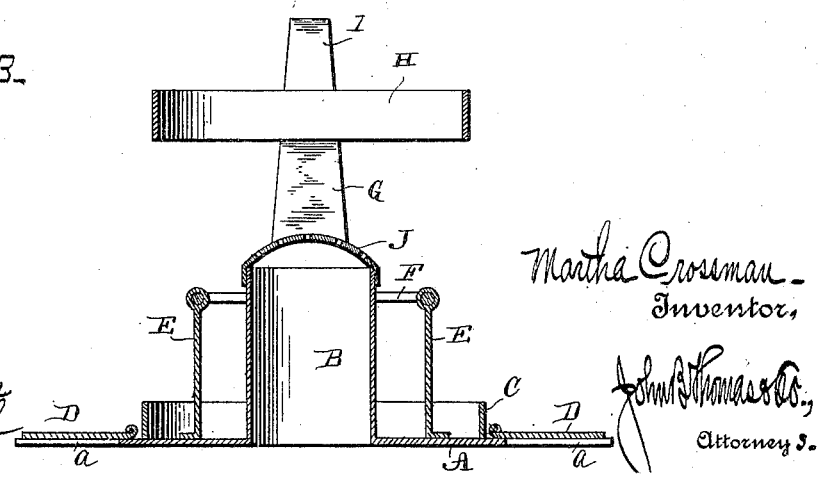

UNITED STATES PATENT OFFICE.

MARTHA CROSSMAN, OF BROCKWAYVILLE, PENNSYLVANIA.

HEATING DEVICE FOR FRUIT-JARS.

SPECIFICATION forming part of Letters Patent No. 652,511, dated June 26, 1900.

Application filed March 10, 1900. Serial No. 8,210. (No model.)

*To all whom it may concern:*

Be it known that I, MARTHA CROSSMAN, a citizen of the United States, and a resident of Brockwayville, in the county of Jefferson and State of Pennsylvania, have invented a Heating Device for Fruit-Jars, of which the following is a specification.

In the process of canning and preserving fruit in glass jars it is necessary that the jars be heated in order to obtain the best results and to prevent their cracking when the hot fruit is poured therein. It is customary to heat the jars in a pan of hot water or rinse them with hot water preparatory to putting in the fruit; but this does not ordinarily effect a thorough heating of the jars, and the latter method is also objectionable in that it results in a waste of time. Therefore, appreciating the fact that the process of canning and preserving can be better and more speedily accomplished by the use of a heating device which will quickly and thoroughly heat the jars, I have produced such a device which is especially adapted to be used in connection with a tea-kettle and is so constructed that the steam generated in the kettle will be led into the jar and discharged against the bottom and sides thereof, provision being made for cutting off the supply of heat to the jar during the operation of removing one jar and placing another in the device.

The following specification enters into a detail description of my invention, reference being had to the accompanying drawings and to letters thereon which designate the different parts, and what I claim in the particular construction and combination is particularly set forth in the appended claims.

In the drawings forming a part hereof, Figure 1 is a plan view of a heating device for fruit-jars constructed in accordance with my invention. Fig. 2 is a side elevation. Fig. 3 is a vertical sectional view on the line 3 3 of Fig. 1.

Referring to said drawings, A designates a plate which forms the bottom of the device, said plate being preferably circular in shape, and is provided centrally with an upwardly-projecting tube B. Surrounding said tube at a suitable distance therefrom the bottom plate A is provided with an upwardly-projecting annular flange C, forming a receptacle between said flange and the tube, for the purpose hereinafter set forth, and beyond said flange C the bottom plate is provided with openings a, which are covered by hinged lids D.

Mounted upon the bottom plate between the flange or circular wall C and the central tube B are standards E, which support a wire ring F, disposed horizontally and slightly below the plane of the upper end of said central tube. This ring is adapted to support the fruit-jars, and as the device is especially adapted for the purpose of heating Mason fruit-jars the ring is of such diameter as to fit over the mouth of the jar, it being understood that the mouths of Mason fruit-jars are of the same size though the jars themselves may be of different sizes.

In order to form an additional support for the jar, standards G G extend from the bottom plate and support a ring or band H at a suitable distance above the ring F, this band being slightly larger than a quart-size jar, and will form a support for the jar to rest against. The standards supporting the ring or band H are shaped into handles I, by which the device may be handled.

Though the upper end of the tube B may be open, I prefer to close the same by a perforated cap J, shaped as shown in the drawings and the perforations so disposed as to direct the steam against the bottom and sides of the jar supported in the device.

The device is preferably made up of tin, though of course any other metal may be used, and being made up of but few parts it can be readily wiped off or cleaned.

In use the device is placed upon a tea-kettle or other vessel, and said kettle or vessel is kept heated so that the water therein will remain at the boiling-point and supply the steam required in the operation of the device. A jar is passed down through the band H, and the mouth inserted into the ring F, the tube B then extending into the jar. During the operation of placing the jar into the holder one of the lids D is preferably open to temper the jar before allowing all of the steam to enter the same. After the lids D are closed the jar will be quickly heated, the condensed steam dropping into the receptacle formed by the circular wall C and being confined therein. After a jar has been sufficiently heated both lids are raised to give an outlet for the steam in the kettle and prevent it from interfering with the removal of the jar, and by reducing the amount of steam issuing from the tube will allow the next jar to be tempered before receiving the full effect of the steam. It will be noted, therefore, that the device provides a means for quickly and thoroughly heating the jars, so that they will be in proper condition to receive the heated fruit or preserves, and as said jars are supported in the device bottom up they are grasped at the bottom and turned up to receive the fruit, facilitating the operation. However, I contemplate turning the jar and supporting it right side up in the device, so that it can be kept heated while the fruit is being poured therein.

In addition to the particular use of the device in canning and preserving it will also be found of service in other culinary work, such as keeping cooked vegetables warm or for warming milk.

Having thus described my invention, what I claim as new, and desire to secure by Letters Patent, is—

1. A heating device for fruit-jars, to be used in connection with a kettle or other vessel, comprising a bottom plate having marginal openings therein, lids covering said openings, a tube projecting upward from the bottom plate, a perforated cap on the upper end of the tube, and rings supported one above the other, substantially as shown and for the purpose set forth.

2. A heating device for fruit-jars, to be used in connection with a kettle or other vessel, comprising a bottom plate, a tube projecting upward therefrom, a perforated cap on the upper end of said tube, a wall surrounding the tube, and rings supported one above the other and adapted to support the jar, the lower ring being located below the upper end of the tube, substantially as shown and for the purpose set forth.

3. A heating device for fruit-jars to be used in connection with a kettle or other vessel, comprising a bottom plate, a tube projecting upward therefrom, a wall surrounding the tube, and openings through the bottom plate covered by lids; together with rings supported one above the other, the lower ring surrounding the tube below the upper end thereof; the device being provided with handles, substantially as shown and for the purpose set forth.

MARTHA CROSSMAN.

Witnesses:
I. R. BAIRD,
J. F. ARMSTRONG.